United States Patent
Hewel et al.

(10) Patent No.: US 8,420,221 B2
(45) Date of Patent: Apr. 16, 2013

(54) SEMIAROMATIC MOULDING COMPOSITIONS AND USES OF THESE

(75) Inventors: Manfred Hewel, Domat/Ems (CH); Botho Hoffmann, Domat/Ems (CH); Andreas Bayer, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 365 days.

(21) Appl. No.: 12/949,945

(22) Filed: Nov. 19, 2010

(65) Prior Publication Data

US 2011/0123749 A1 May 26, 2011

(30) Foreign Application Priority Data

Nov. 23, 2009 (EP) ..................................... 09176752

(51) Int. Cl.
*B32B 27/08* (2006.01)
*B32B 27/34* (2006.01)

(52) U.S. Cl.
USPC ...... 428/474.4; 428/36.9; 428/34.1; 524/606; 524/291; 524/169; 524/139; 525/184; 252/511; 264/209.1

(58) Field of Classification Search ................. 428/36.9, 428/34.1, 474.4; 524/606, 291, 169, 139; 525/184; 252/511; 264/209.1
See application file for complete search history.

(56) References Cited

U.S. PATENT DOCUMENTS

2008/0274335 A1   11/2008  Bowman et al.

FOREIGN PATENT DOCUMENTS

| EP | 1 505 099 A2 | 2/2005 |
| EP | 1 710 482 A1 | 10/2006 |
| EP | 1 988 113 A1 | 11/2008 |
| WO | 98/11398 A1 | 3/1998 |

*Primary Examiner* — Michael C Miggins
(74) *Attorney, Agent, or Firm* — Sughrue Mion, PLLC

(57) ABSTRACT

A polyamide molding composition with the following constitution is described:
(a) from 40 to 90% by weight of a copolyamide, where this is composed of
(a1) 1,6-hexanediamine and 1,10-decanediamine and also
(a2) terephthalic acid and at least one other polyamide-forming monomer selected from the group of: dicarboxylic acid having from 8 to 18 carbon atoms, laurolactam, aminolauric acid, and/or mixtures thereof;
(b) from 10 to 40% by weight of macromolecular plasticizers, with the proviso that these can have been replaced to some extent by low-molecular-weight plasticizers;
(c) from 0 to 20% by weight of additives and/or added substances.

Uses of this type of molding composition are also described, in particular for the production of a fuel line, cooling line, oil line or urea line for the automobile sector, as also are production processes to give moldings.

29 Claims, No Drawings ns and Uses of These

TECHNICAL FIELD

The present invention relates to polyamide moulding compositions based on a terephthalic acid copolyamide, and also to processes for producing these and uses thereof.

PRIOR ART

Known standard polyamides, examples being PA6 and PA66, are easy to process and have high melting points and high heat resistances, in particular when they have been reinforced with glass fibres or comprise mineral fillers. However, they typically have high water absorptions of up to 10% on storage in water. These aliphatic polyamides cannot be used for many applications with stringent requirements for dimension stability which also apply under wet or moist conditions. Water absorption causes not only dimensional change but also change of mechanical properties. Water absorption reduces stiffness values and strength values to a fraction of the initial value. In other words, use of standard polyamides in applications of this type in applications involving mechanical load in contact with water or ambient moisture is problematic.

Long-chain aliphatic polyamides made of aminoundecanoic acid (PA11) or laurolactam (PA12) or made of dodecanediamine and dodecanedioic acid (PA1212) have low water absorption but have undesirable low melting points below 200° C. PA11, PA12 and PA1212 have low modulus and low strength even when dry. They are unsuitable for technical applications at relatively high temperatures.

EP-A-1 505 099 discloses moulding compositions for fluid lines, where these comprise a semiaromatic polyamide, specifically based on an aliphatic diamine having from 8 to 20 carbon atoms, and on an aromatic dicarboxylic acid, e.g. terephthalic acid, and also on lactam-12 or aminoundecanoic acid, or on a condensation product of a diamine with an aliphatic diacid or with isophthalic acid. The moulding composition also comprises at least one additive, nanofiller, plasticizer or (crosslinked) polyolefin. Systems specifically mentioned are those such as PA 11/10T and PA 1010/10T (where T is terephthalic acid) with a plasticizer (BBSA) and, as polyolefin, "Cocktail LT". Even after a short extrusion time, the moulding compositions used in the examples result in deposits that are difficult to remove, on the screw and pipe head. The water absorption of these moulding compositions is also still too high.

EP-A-1 710 482 moreover describes multilayer pipes of which the internal layer is composed of semiaromatic polyamides, based on C9-13 diamines. The polyamides 9T, 9N, 12T and 12N (where N is naphthalamide) are used in the examples.

EP-A-1 988 113 discloses copolyamides based on PA 10T/6T, in particular for production of thermoplastically processable moulded items, examples being housings for water-conducting components, etc. Here again, the problem is that the moulding compositions used in the examples can form deposits on the screw and pipe head, even after a short extrusion time.

DESCRIPTION OF THE INVENTION

It is therefore an object of the present invention to provide a polyamide moulding composition which is suitable in particular (but not exclusively) for producing containers, profiles or fluid-conducting lines in the automobile sector, for example for fuel lines, cooling lines, oil lines, urea lines, etc. Lines of this type have to comply with specific mechanical requirements, not only within defined wide temperature ranges but also when exposed to a certain level of chemical stress.

Another object of the present invention is to provide such a moulding composition which not only complies with the prescribed mechanical requirements but also can be processed without difficulty in an extrusion process. Specifically, it has actually been found that although inter alia the extrusion materials known from the abovementioned prior art can in principle be processed via extrusion to give pipes or profiles, they have the serious disadvantage, which is of decisive importance for practical purposes, that at the required high processing temperatures during industrial production they cause, in particular on the screw and in the discharge head, deposits within the extruder that cannot be removed with conventional purging materials and cleaning materials. Furthermore, the extrusion process can be conducted only within a very narrow temperature range, if the products to be obtained are compact, rather than foamed, pipes. Any interruption during the extrusion process moreover leads to foaming of the moulding composition. Once the extrusion process has been resumed, a very long period of purging is necessary when using the materials of the prior art before it becomes possible again to produce compact pipes of adequate quality. This means that large amounts of waste are produced here, making the extrusion process technically unsatisfactory. The said moulding compositions are therefore substantially unsuitable for extrusion processing. This is where the invention is useful. Specifically, the present invention provides a polyamide moulding composition with the following constitution:

(a) from 40 to 90% by weight of a copolyamide, where this is composed of
  (a1) 1,6-hexanediamine and 1,10-decanediamine and also
  (a2) terephthalic acid and at least one other polyamide-forming monomer selected from the group of: dicarboxylic acid having from 8 to 18 carbon atoms, laurolactam, aminolauric acid, and/or mixtures thereof;
(b) from 10 to 40% by weight of macromolecular plasticizers, with the proviso that these can have been replaced to some extent by low-molecular-weight plasticizers;
(c) from 0 to 20% by weight of additives and/or added substances.

It has been found that this specific selection can firstly comply with the mechanical requirements prescribed by way of example for liquid lines in the automobile sector (where all of the examples pass the VW TL 52435 low-temperature impact test without fracture, for example), and secondly that the production process for lines of this type can be conducted without difficulty in an extrusion process, i.e. that the abovementioned disadvantages do not arise during the production process. In particular, the result, at the relatively low processing temperatures required, is to avoid the deposits which occur within the extruder in the prior art and which are difficult to remove, in particular on the screw and in the discharge head. Furthermore, the extrusion process can be conducted within a relatively wide temperature range, giving pipes that are compact, rather than foamed. Any interruption during extrusion processing does not moreover lead to foaming of the moulding composition within the extruder and within the pipe head (extrusion die). Once the extruder has been restarted, there is none of the requirement applicable to the use of materials of the prior art for purging before it is possible to resume production of compact pipes, and correspondingly there are also no large amounts of waste that can render the extrusion process uneconomic.

According to one first preferred embodiment of the polyamide moulding composition proposed, this is characterized in that within (a1) the proportion of 1,6-hexanediamine is from 10 to 40 mol % and the proportion of 1,10-decanediamine is from 60 to 90 mol %, and that within (a2) the proportion of terephthalic acid is from 60 to 90 mol %, and the proportion of other polyamide-forming monomers is from 10 to 40 mol %, where it is preferable that within (a1) the proportion of 1,6-hexanediamine is from 15 to 35 mol % and the proportion of 1,10-decanediamine is from 65 to 85 mol %, and that within (a2) the proportion of terephthalic acid is from 65 to 85 mol %, and the proportion of other polyamide-forming monomers is from 15 to 35 mol %. When it is stated here and hereinafter that the proportion of other polyamide-forming monomers is within a certain mol % range, this means in the case of laurolactam and aminolauric acid that the corresponding ranges are based on the total amount (entirety) of dicarboxylic acid (inclusive of terephthalic acid), laurolactam and aminolauric acid.

A somewhat more specific embodiment is characterized in that, within (a1), the proportion of 1,6-hexanediamine is from 15 to 30 or from 15 to 25 mol % and the proportion of 1,10-decanediamine is from 70 to 85 or from 75 to 85 mol %, and that within (a2) the proportion of terephthalic acid is from 75 to 85 mol %, and the proportion of other polyamide-forming monomers is from 15 to 25 mol %, where the other polyamide-forming monomers have preferably been selected in the form of dicarboxylic acid having from 8 to 18 carbon atoms.

The C8-C18 dicarboxylic acids used can be of aromatic, aliphatic or cycloaliphatic type. Examples of suitable dicarboxylic acids are isophthalic acid (IPA), naphthalene-dicarboxylic acid (NDA), suberic acid (C8), azelaic acid (C9), sebacic acid (C10), undecanedioic acid (C11), dodecanedioic acid (C12), brassylic acid (C13), tetradecanedioic acid (C14), pentadecanedioic acid (C15), hexadecanedioic acid (C16), heptadecanedioic acid (C17), octadecanedioic acid (C18), cis- and/or trans-cyclohexane-1,4-dicarboxylic acid, cis- and/or trans-cyclohexane-1,3-dicarboxylic acid (CHDA), and/or mixtures thereof, where it is particularly preferable that the dicarboxylic acid having from 8 to 18 carbon atoms has been selected from the group of isophthalic acid, sebacic acid (C10), undecanedioic acid (C11) and dodecanedioic acid (C12), and where the latter is in particular preferred, because it exhibits an excellent combination of mechanical properties and processing properties.

In respect of the copolyamide component, it is preferable that the proportion of (a) is in the range from 60 to 85% by weight, preferably in the range from 64 to 80% by weight. In respect of the additive component it is preferable that the proportion of (c) is in the range from 0.5 to 5.0% by weight, in particular in the range from 0.8 to 3.0% by weight.

In respect of plasticizer component, it is preferable that the proportion of (b) is in the range from 15 to 35% by weight, preferably in the range from 20 to 35% by weight, particularly preferably in the range from 22 to 33% by weight.

In respect of the plasticizer content, it has proved to be particularly advantageous that the proportion (b) is essentially constituted of
(b1) a proportion of from 10 to 35% by weight of macromolecular plasticizer, preferably a proportion of from 20 to 35% by weight, particularly preferably a proportion of from 20 to 33% by weight, and (b2) a proportion of from 5 to 20% by weight of low-molecular-weight plasticizer, preferably a proportion of from 5 to 15% by weight, particularly preferably a proportion of from 7 to 15% by weight.

According to another preferred embodiment, it has proved to be advantageous in respect of the plasticizer content that the proportion (b) comprises a proportion of from 10 to 40% by weight of exclusively macromolecular plasticizer, preferably a proportion of from 15 to 35% by weight, particularly preferably a proportion of from 22 to 33% by weight.

As already mentioned in the introduction, the processing temperature is decisive for appropriate processing. The moulding compositions according to the present invention exhibit a relatively low processing temperature, and this inter alia avoids the production problems encountered when using the materials of the prior art. In particular, the various proportions (a)-(c) have been selected, in accordance with the components, in such a way that the polyamide moulding composition has a melting point below 275° C. or below 270° C., preferably at most 265° C. It is particularly preferable that the melting point is in the range from 240-270° C., and it is more preferable that it is in the range from 250 to 265° C. This type of polyamide moulding composition moreover has excellent low water absorption, typically having a water absorption at 95° C. and 336 h of at most 3.5%, preferably at most 3%.

The polyamide moulding composition according to the invention moreover has excellent tensile strain at break. It therefore typically and specifically has a tensile strain at break of at least 5%, measured on tensile specimens.

The polyamide moulding composition according to the invention has also proved to be particularly suitable in relation to tensile properties, and thus mouldings made of the polyamide moulding composition have a tensile modulus of elasticity that is typically in the range from 400 to 1600 MPa, preferably in the range from 500 to 1500 MPa.

One very specific and particularly suitable embodiment is characterized by the following combination of features: the polyamide moulding composition is composed of
(a) from 64 to 80% by weight of a copolyamide composed of
  (a1) from 15 to 25 mol % of 1,6-hexanediamine and from 75 to 85 mol % of 1,10-decanediamine,
  (a2) from 75 to 85 mol % of terephthalic acid and from 15 to 25 mol % of dodecanedioic acid,
(b) from 15 to 35% by weight of a macromolecular plasticizer based on g-MAH ethylene-propylene copolymer, if appropriate with replacement of up to half by a low-molecular-weight plasticizer, in particular based on an N-alkylbenzenesulphonamide,
(c) from 0.8 to 3.0% by weight of additives.

The moulding composition according to the invention comprises from 10 to 40% by weight of plasticizer, where preference is given to macromolecular plasticizers. However, it is also possible to use a mixture of macromolecular and low-molecular-weight plasticizers.

A general rule applicable to the plasticizer component is that, according to one preferred embodiment, the macromolecular plasticizer is a polyolefin homopolymer or polyolefin copolymer, preferably selected from the group of ethylene-α-olefin copolymer, terpolymer based on ethylene-C3-12-α-olefin with an unconjugated diene, ethylene-acrylate copolymer, ethylene-butylene copolymer, and/or mixtures thereof, where the macromolecular plasticizer preferably has constituents having anhydride groups, in particular in the form of a maleic anhydride graft (g-MAH), where the macromolecular plasticizer has particularly preferably been selected from maleic-anhydride-modified ethylene-propylene copolymer.

According to another preferred embodiment, the moulding compositions according to the invention are therefore characterized in that component (b) comprises a polyolefin homopolymer or an ethylene-α-olefin copolymer, particularly preferably an EP elastomer and/or EPDM-elastomer (ethylene-propylene rubber and, respectively, ethylene-propylene-diene rubber). The material can therefore by way of example be an elastomer based on an ethylene-C3-12-α-olefin copolymer having from 20 to 96% by weight, preferably from 25 to 85% by weight, of ethylene, where it is particularly preferable that the C3-12-α-olefin is an olefin selected from the group of propene, 1-butene, 1-pentene, 1-hexene, 1-octene, 1-decene and/or 1-dodecene, and component C is particularly preferably ethylene-propylene rubber and/or LLDPE and/or VLDPE.

As an alternative or addition (for example in a mixture), (b) can comprise a terpolymer based on ethylene-C3-12-α-olefin with an unconjugated diene, where this terpolymer preferably comprises from 25 to 85% by weight of ethylene and up to a maximum in the region of 10% by weight of an unconjugated diene, and where the C3-12-α-olefin is particularly preferably an olefin selected from the group of propene, 1-butene, 1-pentene, 1-hexene, 1-octene, 1-decene and/or 1-dodecene, and/or where the unconjugated diene has preferably been selected from the group of bicyclo[2.2.1]heptadiene, hexadiene-1,4-dicyclopentadiene and/or in particular 5-ethylidenenorbornene.

It is moreover also possible to use ethylene-acrylate copolymers as constituent for component (b).

Other possible forms of constituents for component (b) are the ethylene-butylene copolymers, and mixtures (blends) comprising systems of that type.

It is preferable that component (b) has constituents having anhydride groups, where these are introduced via thermal or free-radical reaction of the main chain polymer with an unsaturated dicarboxylic anhydride, with an unsaturated dicarboxylic acid or with an unsaturated monoalkyl dicarboxylate, at a concentration adequate for good coupling to the polyamide, where reagents used for this purpose are preferably those selected from the following group: maleic acid, maleic anhydride, monobutyl maleate, fumaric acid, aconitic acid and/or itaconic anhydride. It is preferable that from 0.1 to 4.0% by weight of an unsaturated anhydride are grafted onto component (b) or that the unsaturated dicarboxylic anhydride or its precursor is applied by grafting in conjunction with another unsaturated monomer. The degree of grafting is generally and preferably in the range from 0.1 to 1.0%, particularly preferably in the range from 0.3 to 0.7%. Another possible constituent of component (b) is a mixture, e.g. made of an ethylene-propylene copolymer and of an ethylene-butylene copolymer, where the degree of maleic-anhydride grafting (degree of MAH grafting) thereof is in the range from 0.3 to 0.7%.

The possible systems cited above for the component can also be used in a mixture. Component (b) can moreover have constituents which have functional groups, e.g. carboxylic acid groups, ester groups, epoxy groups, oxazoline groups, carbodiimide groups, isocyanate groups, silanol groups and carboxylate groups, or which comprise a combination of two or more of the functional groups mentioned. Monomers which bear these functional groups can be bonded to the elastomeric polyolefin via copolymerization or grafting.

The macromolecular plasticizers based on the olefin polymers can moreover also have been modified by grafting with an unsaturated silane compound, e.g. vinyltrimethoxy-silane, vinyltriethoxysilane, vinyltriacetosilane, methacryloxypropyltrimethoxysilane or propenyltrimethoxysilane.

The elastomeric polyolefins are preferably random, alternating or segmented copolymers with linear, branched or core-shell structure, and comprise functional groups which can react with the terminal groups of the polyamides, thus giving adequate compatibility between polyamide and macromolecular plasticizer.

The macromolecular plasticizers according to the invention therefore generally include homopolymers or copolymers of olefins, e.g. ethylene, propylene, 1-butene, or copolymers of olefins and copolymerizable monomers, e.g. vinyl acetate, (meth)acrylic ester and methylhexadiene.

Examples of crystalline olefin polymers are low-, medium- and high-density polyethylenes, and other examples are polypropylene, polybutadiene, poly-4-methylpentene, ethylene-propylene block copolymers or ethylene-propylene random copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-vinyl acetate) (EVA), poly(ethylene-ethyl acrylate) (EEA), ethylene-octene copolymer, ethylene-butene copolymer, ethylene-hexene copolymer, ethylene-propylene-diene terpolymers, and also combinations of the polymers mentioned.

Examples of commercially available macromolecular plasticizers which can be used within the scope of the constituents of component (b) are:

TAFMER MC201: g-MAH (–0.6%) blend of 67% EP copolymer (20 mol % propylene)+33% EB copolymer (15 mol % 1-butene): Mitsui Chemicals, Japan.
TAFMER MH5010: g-MAH (–0.6%) ethylene-butylene copolymer; Mitsui.
TAFMER MH7010: g-MAH (–0.7%) ethylene-butylene copolymer; Mitsui.
TAFMER MH7020: g-MAH (–0.7%) EP copolymer, Mitsui.
EXXELOR VA1801: g-MAH (–0.7%) EP copolymer; ExxonMobil Chemical, US.
EXXELOR VA1803: g-MAH (0.5-0.9%) EP copolymer, amorph., Exxon.
EXXELOR VA1810: g-MAH (–0.5%) EP copolymer, Exxon
EXXELOR MDEX 94-1 1: g-MAH (0.7%) EPDM, Exxon.
FUSABOND MN493D: g-MAH (–0.5%) ethylene-octene copolymer, DuPont, US.
FUSABOND A EB560D (g-MAH) ethylene-n-butyl acrylate copolymer, DuPont.
ELVALOY, DuPont.

Preference is also given to an ionomer in which the polymer-bonded carboxy groups have been bonded to one another entirely or to some extent via metal ions.

Preference is given to copolymers of butadiene with styrene that have been functionalized via grafting with maleic anhydride, to nonpolar or polar olefin homo- and copolymers produced via grafting with maleic anhydride and to carboxylic acid-functionalized copolymers, such as poly(ethene-co-(meth)acrylic acid) or poly(ethene-co-1-olefin-co-(meth)acrylic acid), in which the acid groups have been neutralized to some extent with metal ions.

It is preferable that the macromolecular plasticizers according to the invention (component (b1)) comprise no acrylates or methacrylates as monomer unit.

It is particularly preferable that MAH-modified ethylene-propylene copolymers are used as macromolecular plasticizers.

For the purposes of the present invention, low-molecular-weight plasticizers are also used if appropriate, in addition to the macromolecular plasticizers. The concentration of the low-molecular-weight plasticizers is then—based on the moulding composition—from 5 to 20% by weight, preferably from 5 to 15% by weight and particularly preferably from 7 to 15% by weight.

According to one preferred embodiment, the low-molecular-weight plasticizer has been selected from the group of: octyl p-hydroxybenzoate, benzenesulphonamide, N-alkylbenzenesulphonamides, where the alkyl moieties bear a total of from 1 to 20 carbon atoms, preferably N-butylbenzenesulphonamide, N-octylbenzenesulphonamide, N-cyclohexylbenzenesulphonamide, toluenesulphonamide, N-alkyltoluenesulphonamides, where the alkyl groups comprise from 1 to 20 carbon atoms, preferably N-ethyltoluene-sulphonamide. The systems mentioned can be used individually or in a mixture. Particularly preferred is a mixture of N-alkylbenzenesulphonamide and of p-toluenesulphonamide.

In respect of the additive component (component (c)), this is preferably characterized in that the additive or, respectively, the added substances (for example further polymer) have been selected from the group of: crystallization accelerators or crystallization retarders, flow aids, lubricants, mould-release agents, pigments, dyes and markers, stabilizers, processing aids, antistatic agents, nanoparticles in lamellar form, conductivity additives, such as carbon black, graphite powder or carbon nanofibrils, flame retardants, in particular halogen-free flame retardants, particular examples being those that are phosphinic-salt-based, residues from polymerization processes, examples being catalysts, salts and derivatives of these, and also regulators, examples being monoacids and monoamines. The copolyamides according to the invention can be produced in polycondensation plants conventionally used for polyamides, by the batch process or by way of the process sequence involving precondensate and postcondensation. It is preferable that chain regulators are used for the polycondensation process in order to regulate viscosity. Suitable chain regulators are monoamines or monoacids, e.g. acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethyl-hexylamine, n-octylamine, n-dodecylamine, n-tetradecylamine, n-hexadecylamine, stearylamine, cyclohexylamine, 3-(cyclohexylamino)propylamine, methylcyclohexyl-amine, dimethylcyclohexylamine, benzylamine, 2-phenylethylamine, etc.

Viscosity can also be adjusted via use of an excess of diamine or of diacid.

In order that the salt solutions are homogeneous and clear at the dissolver temperatures of from 180 to 230° C., it is usual to add from 20 to 30% of water to the monomers. In order to prevent excessive foaming during depressurization and devolatilization, it is preferable that an antifoaming agent is added to the mixtures. Suitable antifoaming agents are aqueous silicone emulsions, polydimethylsiloxane on a solid carrier, e.g. zeolite, anhydrous, high-molecular-weight polysiloxane or siloxanes in organic water-soluble solvents, the amount of these being from 0.01 to 0.5% by weight.

Polycondensation catalysts preferably added to the monomer mixtures are from 0.005 to 1.5% by weight of phosphorus compounds, such as phosphoric acid, phosphorous acid, hypophosphorous acid, phenylphosphonic acid, phenylphosphinic acid and/or salts thereof having mono- to trivalent cations, e.g. Na, K, Mg, Ca, Zn or Al and/or esters thereof with, for example, triphenyl phosphate, triphenyl phosphite or tris(nonylphenyl) phosphite. Preference is given to hypophosphorous acid and to sodium hydrogen hypophosphite monohydrate, where the amount of phosphorus is from 100 to 500 ppm, based on the copolyamide.

The polyamide moulding composition can in principle take the form of granules or of powder, or else of a semifinished product or elongate granules, where these can be fibre-crosslinked materials, in particular with use of fibres made of glass, carbon, other plastics, etc.

The present invention further provides mouldings produced from a polyamide moulding composition as described above. The mouldings can by way of example be profiles or constituents of housings, or can be components that conduct liquids or gases (fluids), in particular from the automobile sector. They are preferably mouldings in the form of a liquid container or of a liquid line, in particular for the automobile sector for conducting liquids, such as preferably fuels, coolants, urea solutions and/or oils. The mouldings are particularly preferably fuel lines (petrol lines, diesel lines), cooling lines, oil lines or urea lines. In the case of a pipeline, this preferably has a tensile strain at break of at least 100%. These containers or lines can be composed of a single-layer structure (the wall therefore being exclusively formed from one layer composed of the polyamide moulding composition) or can be composed of a multilayer structure, wherein in the latter case at least one of the layers is composed of the polyamide moulding composition mentioned.

In other words, the present invention also provides the use of the specified polyamide moulding composition for producing these mouldings.

The present invention also provides the use of these polyamide moulding compositions in extrusion processes. Specifically, it preferably provides a process for producing a moulding, for example one as described above, which is characterized in that the moulding is produced in an extrusion process, typically at a barrel temperature in the range from 280 to 320° C., particularly preferably to give a pipeline.

The dependent claims give further embodiments.

DESCRIPTION OF PREFERRED EMBODIMENTS

The invention will be explained in more detail below with the aid of specific examples. The examples presented below serve to support the subject matter for which protection is sought and which is set out in the claims, and serve to provide evidence of workability. The examples are not to be used to restrict interpretation of the claims.

Production of copolyamides CoPA-1 to CoPA-5:

Batch process: The systems CoPA-1 to CoPA-3 and CoPA-5 cited in Table 1 are produced in a batch process, where the reaction mixtures stated in the table are treated in a 300 l autoclave with upstream dissolution vessel (dissolver).

TABLE 1

| Constitution | Unit | CoPA-1 | CoPA-2 | CoPA-3 | CoPA-4 | CoPA-5 |
|---|---|---|---|---|---|---|
| Copolyamides, component (a) | | | | | | |
| 1.6-Hexanediamine | parts by wt. | 5.372 | 7.535 | 5.430 | 4.4869 | |
| 1,10-Decanediamine | parts by wt. | 30.443 | 28.830 | 34.846 | 30.7045 | 28.830 |

TABLE 1-continued

Copolyamides, component (a)

| Constitution | Unit | CoPA-1 | CoPA-2 | CoPA-3 | CoPA-4 | CoPA-5 |
|---|---|---|---|---|---|---|
| Terephthalic acid | parts by wt. | 27.430 | 25.503 | 22.463 | 33.9772 | 25.503 |
| Sebacic acid | parts by wt. | | | 15.945 | | |
| Dodecanedioic acid | parts by wt. | 9.951 | 14.934 | | | |
| Aminoundecanoic acid | parts by wt. | | | | | 22.469 |
| Properties | | | | | | |
| Solution viscosity | | 1.77 | 1.73 | 1.83 | 1.62 | 1.78 |
| Terminal COOH groups | mmol/kg | 38 | 14 | 27 | 41 | 12 |
| Terminal NH2 groups | mmol/kg | 58 | 86 | 81 | 105 | 102 |
| Melting point | °C. | 260 | 245 | 249 | 295 | 255 |
| Enthalpy of fusion | J/g | 50 | 42 | 41 | 53 | 47 |
| Glass transition temperature | °C. | 92 | 85 | 77 | 119 | 82 |
| Water absorption | % | 2.9 | 3.0 | 3.0 | 2.7 | 2.7 |
| Tensile modulus of elasticity | MPa | 2800 | 2200 | 2500 | 2900 | 2200 |
| Ultimate tensile strength | MPa | 87 | 73 | 77 | 80 | 64 |
| Tensile strain at break | % | 6.5 | 5.3 | 14 | 3.9 | 3.6 |
| Impact resistance | kJ/m$^2$ | n.f. | 40 | 45 | 70 | 38 |
| Notched impact resistance | kJ/m$^2$ | 5.5 | 4.9 | 4.4 | 5.9 | 4.3 |

The components of the formulation are charged to the dissolver together with regulator, antifoaming agent and water, and are heated to a temperature of about 200° C. to 230° C., with stirring, where the resultant pressure is from 2 to 20 bar. The total dissolver time is from 5 to 9 hours.

The contents of the dissolver are then transferred to the autoclave and heated under pressure to a temperature in the range from 280 to 310° C. while the pressure is simultaneously raised from 2 to 30 bar. The pressure phase is maintained for a period of from 1 to 2 hours. The pressure phase reduces the undesired loss of volatile monomer constituents in the initial stage of polymerization. Following the pressure phase, the mixture is depressurized slowly and in stages. Once atmospheric pressure has been reached, nitrogen is passed continuously over the melt. During the pressure phase and the subsequent devolatilization phase, the melt is continuously stirred. The melt temperature maintained in the devolatilization phase and polycondensation phase is about 290° C. to 310° C.

The treatment of the melt and the condensation process take place in the autoclave under an inert gas atmosphere, in particular under a stream of nitrogen; steam can also be used as part or all of the inert gas atmosphere, for example during the pressure phase.

After the devolatilization phase, the copolyamide is discharged in the form of a strand by way of a melt pump, cooled in a waterbath, and granulated and then dried for 24 hours at 100° C. and reduced pressure.

CoPA-4 is produced by way of a precondensate and subsequent postcondensation. The formulation components according to Table 1 are charged together with catalyst, regulator and water to a 20 l autoclave, and heated to a product temperature of 260° C. within a period of from 50 to 80 minutes (the heating time), maintained for an hour at a pressure of 32 bar and then discharged by way of a die. The precondensate is dried for 24 hours at 120° C. under a vacuum of 30 mbar.

The resultant CoPA precondensate is postcondensed in a twin-screw extruder from Werner and Pfleiderer with a screw diameter of 25 mm using prescribed process parameters (barrel temperature: 340° C., screw rotation rate: 150 rpm, throughput: 4 kg/h). A stream of nitrogen is used in zone 10 to devolatilize the melt. The product is discharged in the form of a strand from a die of diameter 3 mm, and granulated. The granules are dried for 24 hours at 100° C. under a vacuum of 30 mbar.

TABLE 2

Polyamide moulding composition
Inventive Examples 1-6 (IE1-IE6) and Comparative Examples 1 and 2 (CE1, CE2)

| Examples | Unit | CE1 | CE2 | IE1 | IE2 | IE3 | IE4 | IE5 | IE6 |
|---|---|---|---|---|---|---|---|---|---|
| CoPA-1 | % by wt. | | | 77.15 | 69.65 | 72.65 | 64.65 | | |
| CoPA-2 | % by wt. | | | | | | | 77.15 | |
| CoPA-3 | % by wt. | | | | | | | | 77.15 |
| CoPA-4 | % by wt. | | 77.15 | | | | | | |
| CoPA-5 | % by wt. | 64.65 | | | | | | | |
| Tafmer MH-7020 | % by wt. | | 22.50 | 22.50 | 17.00 | 27.00 | 35 | 22.5 | 22.5 |
| Lucalen A2920M | % by wt. | 8.75 | | | | | | | |
| Lotader GMA AX8840 | % by wt. | 8.75 | | | | | | | |
| Lotader 4700 | % by wt. | 17.5 | | | | | | | |
| KI-calcium stearate(98:2) | % by wt. | 0.30 | 0.30 | 0.30 | 0.30 | 0.30 | 0.30 | 0.30 | 0.30 |
| copper(I) iodide | % by wt. | 0.05 | 0.05 | 0.05 | 0.05 | 0.05 | 0.05 | 0.05 | 0.05 |
| BBSA | % by wt. | | | | 13.00 | | | | |

TABLE 2-continued

Polyamide moulding composition
Inventive Examples 1-6 (IE1-IE6) and Comparative Examples 1 and 2 (CE1, CE2)

Properties

|  | | | | | | | | | |
|---|---|---|---|---|---|---|---|---|---|
| Water absorption at 95° C. (after 336 h) | % | 5.4 | 2.9 | 3.0 | n.d. | 2.8 | 2.5 | 3.0 | 5.5 |
| Melting point | ° C. | 255 | 295 | 258 | 251 | 258 | 258 | 244 | 249 |
| Tensile strength of elasticity | MPa | 1120 | 1500 | 1510 | 730 | 1300 | 990 | 1300 | 1500 |
| Ultimate tensile strength | MPa | 36 | 44 | 45 | 36 | 40 | 31 | 40 | 44 |
| Tensile strain at break | % | 70 | 73 | 26 | 150 | 30 | 65 | 48 | 43 |
| Impact resistance | kJ/m$^2$ | n.f. | n.f. | n.f. | n.f. | n.f. | n.f. | n.f. | n.f. |
| Notched impact resistance | kJ/m$^2$ | 70 | 96 | 115 | n.f. | 90 | n.f. | 85 | 85 |
| HDT A | ° C. | 65 | 102 | 70 | 43 | 67 | 62 | 63 | 58 |
| HDT B | ° C. | 84 | 132 | 95 | 83 | 86 | 78 | 77 | 71 |

| Pipe tests | | CE1 | CE2 | IE1 | IE2 | IE3 | IE5 | IE6 |
|---|---|---|---|---|---|---|---|---|
| Tensile strength | MPa | 31 | 38 | 38 | 29 | 38 | 36 | 38 |
| Tensile strain at break | % | 85 | 89 | 123 | 116 | 150 | 165 | 170 |
| Bursting pressure, 23° C. | bar | 84 | 86 | 105 | 65 | 97 | 92 | 95 |
| Bursting pressure, 130° C. | bar | 17 | 35 | 24 | 18 | 22 | 18 | 18 |
| Bending radius | mm | 28 | 34 | 32 | 24 | 27 | 26 | 28 |
| Deposits in pipe extruder | | −− | − | + | + | + | + | + |
| Compactness (foaming) | | + | −− | + | + | + | + | + |
| Surface (gel particles) | | + | − | + | + | + | + | + | n.d.: not determined
Legend for pipe tests table:
Deposits:
−− very severe deposits
− severe deposits
+ no deposits
Compactness:
−− severe foaming of melt, foamed extrudate
+ no foaming, compact extrudate
Surface:
− significant surface defects, poor surface quality
+ good to very good surface quality, no or very few gel particles
Tafmer MH-7020 is a g-MAH (~0.7%) EP copolymer obtainable from Mitsui.
Lucalen A 2920 M is an LDPE obtainable from LyondellBasell Industries.
LOTADER® AX8840 is a random copolymer based on ethylene and glycidyl methacrylate (GMA) obtainable from Arkema.
LOTADER® 4700 is a terpolymer based on ethylene - acrylate - maleic anhydride obtainable from Arkema.
BBSA is n-butylbenzenesulphonamide.

1. Compounding

The copolyamides CoPA-1 to CoPA-5 are compounded in a twin-screw extruder from Werner and Pfleiderer with a screw diameter of 25 mm using prescribed process parameters (barrel temperature, screw rotation rate, throughput). The product is discharged in the form of a strand from a die of diameter 3 mm, and granulated. The granules are dried for 24 hours at 100° C. Cf. Table 3 for the parameters.

TABLE 3

Compounding parameters

| Compounding parameters | Unit | IE1 to IE8 and CE1 | CE2 |
|---|---|---|---|
| Barrel temperature | ° C. | 280-310 | 330 |
| Screw rotation rate | rpm | 150 | 200 |
| Melt temperature | ° C. | 300-320 | 320-340 |
| Throughput | kg/h | 15 | 10 |

2. IM for Test Specimens

The copolyamides and the compounded materials from the inventive examples and comparative examples are injection-moulded to give ISO test specimens by an Arburg Allrounder 320-210-750 injection-moulding machine, at defined cylinder temperatures for zones 1 to 4 and at a defined mould temperature. Cf. Table 4 for the parameters.

TABLE 4

Injection-moulding parameters

| Injection-moulding parameters | Unit | IE1 to IE8 and CE1 | CE2 |
|---|---|---|---|
| Cylinder temperature zone 1 | ° C. | 280 | 315 |
| Cylinder temperature zone 2 | ° C. | 285 | 320 |
| Cylinder temperature zone 3 | ° C. | 290 | 325 |
| Cylinder temperature zone 4 | ° C. | 295 | 330 |
| Mould temperature | ° C. | 60 | 100 |

3. Pipe Extrusion

The compounded materials from the inventive examples and from the comparative examples are processed by a Nokia Maillefer BMA 60-24D pipe extruder to give pipes of dimensions 8×1 mm under the conditions stated below. Cf. Table 5 for the parameters.

TABLE 5

| Pipe-extrusion parameters | | | |
|---|---|---|---|
| Pipe-extrusion parameters | Unit | IE1 to IE8 and CE1 | CE2 |
| Rotation rate | rpm | 64-72 | 38 |
| Melt temperature | ° C. | 300-305 | 308 |
| Take-off speed | m/min | 40 | 40 |
| Barrel temperature | ° C. | 290-300 | 290-310 |

When the materials according to the invention are used, the extrusion process can be conducted entirely without the problems described in the introduction, i.e. no problems arose in connection with deposits in the die, and nor was there any foaming during the process or in the context of interruptions in the conduct of the process.

In the case of Comparative Examples CE1 and CE2, in contrast, severe deposits in the die were observed when the process was conducted on a relatively large scale, and problems arose when the process was interrupted. The problems with conduct of the process make these materials substantially unsuitable for practical use. Comparative Example CE1 here corresponds to a moulding composition corresponding to EP-1 505 099 mentioned in the introduction, and Comparative Example CE2 here corresponds to a moulding composition corresponding to EP-A-1 988 113 mentioned in the introduction.

In other words, the processing problems can be overcome by using the moulding compositions according to the invention.

It was moreover possible to comply with the mechanical requirements in particular from the field of lines for the automobile sector, as is apparent from Table 2. All of the materials according to the invention comply with the requirements relating to low-temperature impact resistance corresponding to the standard VW TL 52435.

The measurements were conducted in accordance with the following standards and on the following test specimens.

Water absorption: storage in water took place at 95° C. for a period of 336 hours, using tensile specimens. Tensile modulus of elasticity: ISO 527 with a tensile testing speed of 1 mm/min. ISO tensile specimen, standard: ISO/CD 3167, type A1, 170×20/10×4 mm, temperature 23° C.

Ultimate tensile strength and tensile strain at break: ISO 527 with a tensile testing speed of 50 mm/min (unreinforced variants). ISO test specimen, standard: ISO/CD 3167, type A1, 170×20/10×4 mm, temperature 23° C.

Thermal behaviour, (melting point, enthalpy of fusion and glass transition temperature (Tg): ISO standard 11357-11-2, granules, Differential Scanning calorimetry (DSC) is conducted with a heating rate of 20° C./min. For the glass transition temperature (Tg), the onset temperature is stated.

Relative viscosity: DIN EN ISO 307, in 0.5% by weight strength by weight m-cresol solution, temperature 20° C., granules.

Charpy impact resistance: ISO 179/*eU; ISO test specimen, standard: ISO/CD 3167, type B1, 80×10×4 mm, temperature 23° C.; *1=without instrumentation, 2=with instrumentation.

Charpy notched impact resistance: ISO 179/*eA; ISO test specimen, standard ISO/CD 3167, type B1, 80×10×4 mm, temperature 23° C.; *1=without instrumentation, 2=with instrumentation.

HDT A (1.8 MPa) and HDT B (0.45 MPa): ISO 75; ISO impact specimen, 80×10×4.

Pipe tests (low-temperature impact resistance, tensile stress at break, tensile strain at break): VW TL 52435; the low-temperature impact resistance test is conducted at −40° C. with 500 g, and the tensile test is conducted longitudinally at 23° C., with 50% humidity at 100 mm/min on 8×1 mm pipes.

Bursting pressure: DIN 73378; 8×1 mm pipe.

Minimum bending radius: SAE J2260, 8×1 mm pipe.

The invention claimed is:

1. A polyamide moulding composition comprising:
    (a) from 40 to 90% by weight of a copolyamide, composed of
        (a1) 1,6-hexanediamine and 1,10-decanediamine as well as
        (a2) terephthalic acid and at least one other polyamide-forming monomer selected from the group of: dicarboxylic acid having from 8 to 18 carbon atoms, laurolactam, aminolauric acid, and/or mixtures thereof;
    (b) from 10 to 40% by weight of macromolecular plasticizers, with the proviso that these are optionally partly replaced by low-molecular-weight plasticizers;
    (c) from 0 to 20% by weight of additives and/or added substances.

2. The polyamide moulding composition according claim 1, wherein the proportion of (a) is in the range from 60 to 85% by weight.

3. The polyamide moulding composition according claim 1, wherein the proportion of (b) is in the range from 15 to 35% by weight.

4. The polyamide moulding composition according claim 1, wherein the proportion of (b) is constituted of
    (b1) a proportion of from 10 to 35% by weight of macromolecular plasticizer, and
    (b2) a proportion of from 5 to 20% by weight of low-molecular-weight plasticizer,
    or that the proportion (b) comprises a proportion of from 10 to 40% by weight of exclusively macromolecular plasticizer.

5. The polyamide moulding composition according claim 1, wherein its melting point is below 275° C.

6. The polyamide moulding composition according claim 1, wherein its water absorption at 95° C. and 336 h is at most 3.5%, and/or its tensile strain at break, measured on tensile specimens, is at least 5%, and/or its tensile modulus of elasticity is in the range from 400 to 1600 MPa.

7. The polyamide moulding composition according claim 1, wherein it is composed of
    (a) from 64 to 80% by weight of a copolyamide composed of
        (a1) from 15 to 25 mol % of 1,6-hexanediamine and from 75 to 85 mol % of 1,10-decanediamine,
        (a2) from 75 to 85 mol % of terephthalic acid and from 15 to 25 mol % of dodecanedioic acid,
    (b) from 15 to 35% by weight of a macromolecular g-MAH plasticizer based on ethylene-propylene copolymer, if appropriate with replacement of up to half by a low-molecular-weight plasticizer,
    (c) from 0.8 to 3.0% by weight of additives.

8. The polyamide moulding composition according claim 1, wherein the additive or, respectively, the added substances have been selected from the group of: crystallization accelerators or crystallization retarders, flow aids, lubricants, mould-release agents, pigments, dyes and markers, stabilizers, processing aids, antistatic agents, nanoparticles in lamellar form, conductivity additives, flame retardants, residues from polymerization processes, examples being catalysts, salts and derivatives of these, and also regulators.

9. Mouldings produced from a polyamide moulding composition according claim 1.

10. The polyamide moulding composition according claim 1, wherein the proportion of (a) is in the range from 64 to 80% by weight, and that the proportion of (c) is in the range from 0.8 to 3.0% by weight.

11. The polyamide moulding composition according claim 1, wherein the proportion of (b) is in the range from 22 to 33% by weight.

12. The polyamide moulding composition according claim 1, wherein the proportion of (b) is constituted of
   (b1) a proportion of from 17 to 27% by weight of macromolecular plasticizer, and
   (b2) a proportion of from 7 to 15% by weight of low-molecular-weight plasticizer, or that the proportion (b) comprises a proportion of from 22 to 33% by weight of exclusively macromolecular plasticizer.

13. The polyamide moulding composition according claim 1, wherein its melting point is in the range from 250 to 265° C.

14. The polyamide moulding composition according claim 1, wherein its water absorption at 95° C. and 336 h is at most 3%, and/or its tensile modulus of elasticity is in the range from 500 to 1500 MPa.

15. The polyamide moulding composition according claim 1, wherein it is composed of
   (a) from 64 to 80% by weight of a copolyamide composed of
   (a1) from 15 to 25 mol % of 1,6-hexanediamine and from 75 to 85 mol % of 1,10-decanediamine,
   (a2) from 75 to 85 mol % of terephthalic acid and from 15 to 25 mol % of dodecanedioic acid,
   (b) from 15 to 35% by weight of a macromolecular g-MAH plasticizer based on ethylene-propylene copolymer, if appropriate with replacement of up to half by a low-molecular-weight plasticizer, based on an N-alkylbenzenesulphonamide,
   (c) from 0.8 to 3.0% by weight of additives.

16. Mouldings produced from a polyamide moulding composition according claim 1, in the form of a liquid container or of a liquid line, for the automobile sector for conducting liquids, namely fuels, coolants, urea or solutions thereof, and/or oils.

17. Mouldings produced from a polyamide moulding composition according claim 1, in the form of a pipeline, with a tensile strain at break of at least 100%.

18. The polyamide moulding composition according to claim 1, wherein within (a1) the proportion of 1,6-hexanediamine is from 10 to 40 mol % and the proportion of 1,10-decanediamine is from 60 to 90 mol %, and wherein within (a2) the proportion of terephthalic acid is from 60 to 90 mol %, and the proportion of other polyamide-forming monomers is from 10 to 40 mol %.

19. The polyamide moulding composition according to claim 18, wherein within (a1) the proportion of 1,6-hexanediamine is from 15 to 35 mol % and the proportion of 1,10-decanediamine is from 65 to 85 mol %, and wherein within (a2) the proportion of terephthalic acid is from 65 to 85 mol %, and the proportion of other polyamide-forming monomers is from 15 to 35 mol %.

20. The polyamide moulding composition according to claim 1, wherein, within (a1), the proportion of 1,6-hexanediamine is from 15 to 30 or from 15 to 25 mol % and the proportion of 1,10-decanediamine is from 70 to 85 or from 75 to 85 mol %, and wherein within (a2) the proportion of terephthalic acid is from 75 to 85 mol %, and the proportion of other polyamide-forming monomers is from 15 to 25 mol %.

21. The polyamide moulding composition according to claim 20, wherein the other polyamide-forming monomers have been selected in the form of dicarboxylic acid having from 8 to 18 carbon atoms.

22. The polyamide moulding composition according claim 1, wherein the dicarboxylic acid having from 8 to 18 carbon atoms is an aromatic, aliphatic or cycloaliphatic dicarboxylic acid selected from the group of: isophthalic acid, naphthalenedicarboxylic acid, suberic acid, azelaic acid, sebacic acid, undecanedioic acid, dodecanedioic acid, brassylic acid, tetradecanedioic acid, pentadecanedioic acid, hexadecanedioic acid, heptadecanedioic acid, octadecanedioic acid, cis- and/or trans-cyclohexane-1,4-dicarboxylic acid, cis- and/or trans-cyclohexane-1,3-dicarboxylic acid, and/or mixtures thereof.

23. The polyamide moulding composition according claim 22, wherein the dicarboxylic acid having from 8 to 18 carbon atoms has been selected from the group of isophthalic acid, sebacic acid (C10), undecanedioic acid (C11) and dodecanedioic acid (C12).

24. The polyamide moulding composition according claim 1, wherein the macromolecular plasticizer is a polyolefin homopolymer or polyolefin copolymer.

25. The polyamide moulding composition according claim 24, wherein the macromolecular plasticizer has constituents having anhydride groups, namely in the form of a maleic anhydride graft (g-MAH), where the macromolecular plasticizer has been selected from maleic-anhydride-modified ethylene-propylene copolymer.

26. The polyamide moulding composition according claim 1, wherein the low-molecular-weight plasticizer has been selected from the group of: octyl p-hydroxybenzoate, benzenesulphonamide, N-alkylbenzenesulphonamides, where the alkyl moieties bear a total of from 1 to 20 carbon atoms.

27. The polyamide moulding composition according claim 26, wherein the low-molecular-weight plasticizer has been selected from N-butylbenzenesulphonamide, N-octylbenzenesulphonamide, N-cyclohexylbenzenesulphonamide, toluenesulphonamide, N-ethyltoluenesulphonamide, and/or mixtures thereof.

28. A process for producing a moulding according to claim 9, wherein the moulding is produced in an extrusion process, with use of a screw extruder, at a barrel temperature in the range from 280 to 320° C.

29. A process for producing a moulding according to claim 9, wherein the moulding is produced in an extrusion process, with use of a screw extruder, at a barrel temperature in the range from 280 to 320° C., to give a pipeline.

* * * * *